United States Patent
Kutaragi et al.

(10) Patent No.: US 6,816,379 B2
(45) Date of Patent: Nov. 9, 2004

(54) EXTERNAL STORAGE DEVICE UNIT, AND INFORMATION PROCESSOR HAVING THE SAME

(75) Inventors: Ken Kutaragi, Tokyo (JP); Takashi Nakamura, Chiba (JP)

(73) Assignee: Sony Computer Entertainment Inc. (JP)

( * ) Notice: Subject to any disclaimer, the term of this patent is extended or adjusted under 35 U.S.C. 154(b) by 282 days.

(21) Appl. No.: 10/061,777

(22) Filed: Nov. 13, 2001

(65) Prior Publication Data

US 2002/0126454 A1 Sep. 12, 2002

(30) Foreign Application Priority Data

Nov. 13, 2000 (JP) ..................................... P2000-344717
Oct. 23, 2001 (JP) ..................................... P2001-325315

(51) Int. Cl.$^7$ ................................................ G06F 1/16
(52) U.S. Cl. ........................ 361/724; 345/716; 248/560; 710/3
(58) Field of Search ................................ 361/724–727; 345/716, 728; 704/275; 710/3; 248/560–561; 312/223.1–223.6

(56) References Cited

U.S. PATENT DOCUMENTS 6,137,679 A * 10/2000 Chang ......................... 361/685
6,166,901 A * 12/2000 Gamble et al. ............. 361/685
6,538,666 B1 * 3/2003 Ozawa et al. ............... 345/728
2002/0089820 A1 * 7/2002 Abboud ....................... 361/685

FOREIGN PATENT DOCUMENTS

| JP | 3-2694 U | 1/1991 |
| JP | 3016419 U | 1/1991 |
| JP | 08-147069 A1 | 6/1996 |
| JP | 08-316679 A1 | 11/1996 |
| JP | 09-081264 A1 | 3/1997 |
| JP | 3040754 U | 6/1997 |
| JP | 11-135958 A | 5/1999 |
| JP | 2000-148299 A1 | 5/2000 |
| JP | 2000-250655 A1 | 9/2000 |
| JP | 2001022475 A | 1/2001 |

* cited by examiner

Primary Examiner—Hung Van Duong
(74) Attorney, Agent, or Firm—Lerner, David, Littenberg, Krumholz & Mentlik, LLP

(57) ABSTRACT

The external storage device unit of the present invention comprises a cover for blocking an opening of a main body casing for storing an external storage device. Connectors for a storage device side connected to external connection connectors of the external storage device, and a connector for a main body side connected to a main body connector for a cover side arranged within the main body casing are arranged in a cover main body. The connectors for the storage device side and the connector for the main body side are electrically connected to each other. Signals are transmitted and received between the external storage device and a game machine main body through the cover.

18 Claims, 12 Drawing Sheets

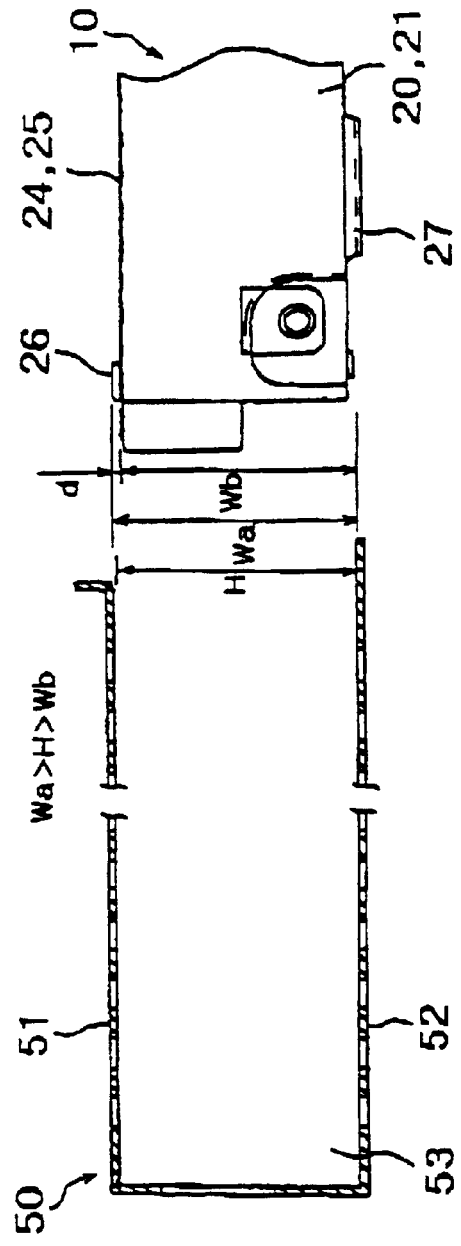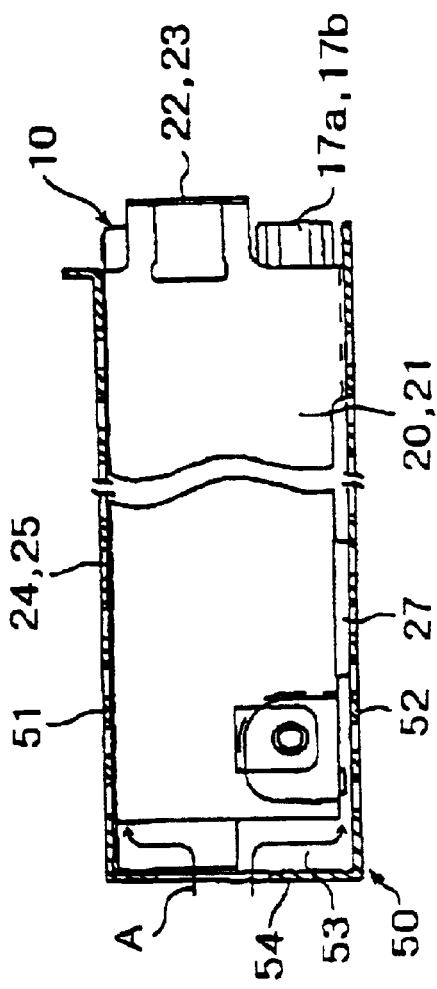

EXTERNAL STORAGE DEVICE UNIT, AND INFORMATION PROCESSOR HAVING THE SAME

BACKGROUND OF THE INVENTION

The present invention relates to an external storage device unit having an external storage device built in a main body casing of an information processor, the information processor having this external storage device unit, and a cover device for a storing opening of the external memory unit.

It is desirable that an external storage device is built in an information processor, such as a game machine, to temporarily store a game status, etc.

An external connection connector is normally arranged in a predetermined place in the external storage device. When the information processor capable of building in such an external storage device is designed, it is necessary to secure a space for storing a connector connected to the external connection connector of the external storage device, and wiring extending from this connector in addition to the external storage device within the main body casing of the information processor.

As mentioned above, since the external connection connector of the external storage device is arranged in a predetermined place of the external storage device, its wiring is also regulated in a position of the external connection connector. Therefore, design of the storing space within the main body casing is greatly regulated to secure this wiring space and the storing space of the connector connected to the external connection connector. Accordingly, a problem exists in that the main body casing is large-sized and the design of the main body casing, etc. are unavoidably changed in a certain case.

SUMMARY OF THE INVENTION

In view of such a problem, an object of the present invention is to provide an external storage device unit capable of securing the degree of freedom of the position of wiring from the external storage device and avoiding a large-sized structure of the main body casing of an information processor and the change in design of the main body casing, etc., and the information processor having this external storage device unit, and a cover device for a storing opening of the external storage device.

In accordance with one embodiment of the present invention an external storage device unit is provided. The external storage device unit is adapted for receiving an external storage device having an external connector. The external storage device unit includes a cover, a storage device side connector, and a main body side connector. The storage device side connector is attached to a first side of the cover and is adapted for electrical connection to the external connector. The main body side connector is attached to the first side of the cover and is electrically connected to the storage device side connector. Preferably, the main body side connector is electrically connected to the storage device side connector with wiring.

In another embodiment of the present invention an information processor is provided. The information processor includes a main body casing having an opening, a cover connector and an external storage device unit. The external storage device unit includes an external storage device, a cover, a storage device side connector and a main body side connector. The external storage device is arranged in the opening. The cover blocks the opening. The storage device side connector is attached to a first side of the cover and is electrically connected to an external connector of the external storage device. The main body side connector is attached to the first side of the cover and is electrically connected to the storage device side connector. The cover connector is connected to the main body side connector.

In accordance with the invention mentioned above, since the connector for a storage device side connected to the external connection connector of the external storage device is arranged in the cover for blocking the opening of the main body casing, it is not necessary to secure a space for storing this connector for a storage device side within the main body casing. Further, the position of wiring for connecting the device main body and the external storage device can be freely changed by suitably setting a position of the connector for a main body side arranged in the cover. In other words, the wiring position can be changed by suitably setting the cover side main body connector connected to this connector for a main body side at a design stage. Accordingly, in the present invention, an increase in size of the main body casing, its design change, etc. can be avoided.

BRIEF DESCRIPTION OF THE DRAWINGS

FIGS. 15A and 15B are explanatory views showing the relation of a storing housing and the external storage device in one embodiment of the present invention.

DETAILED DESCRIPTION

Embodiments of an information processor according to the present invention will next be explained by using the drawings.

Figure 1:
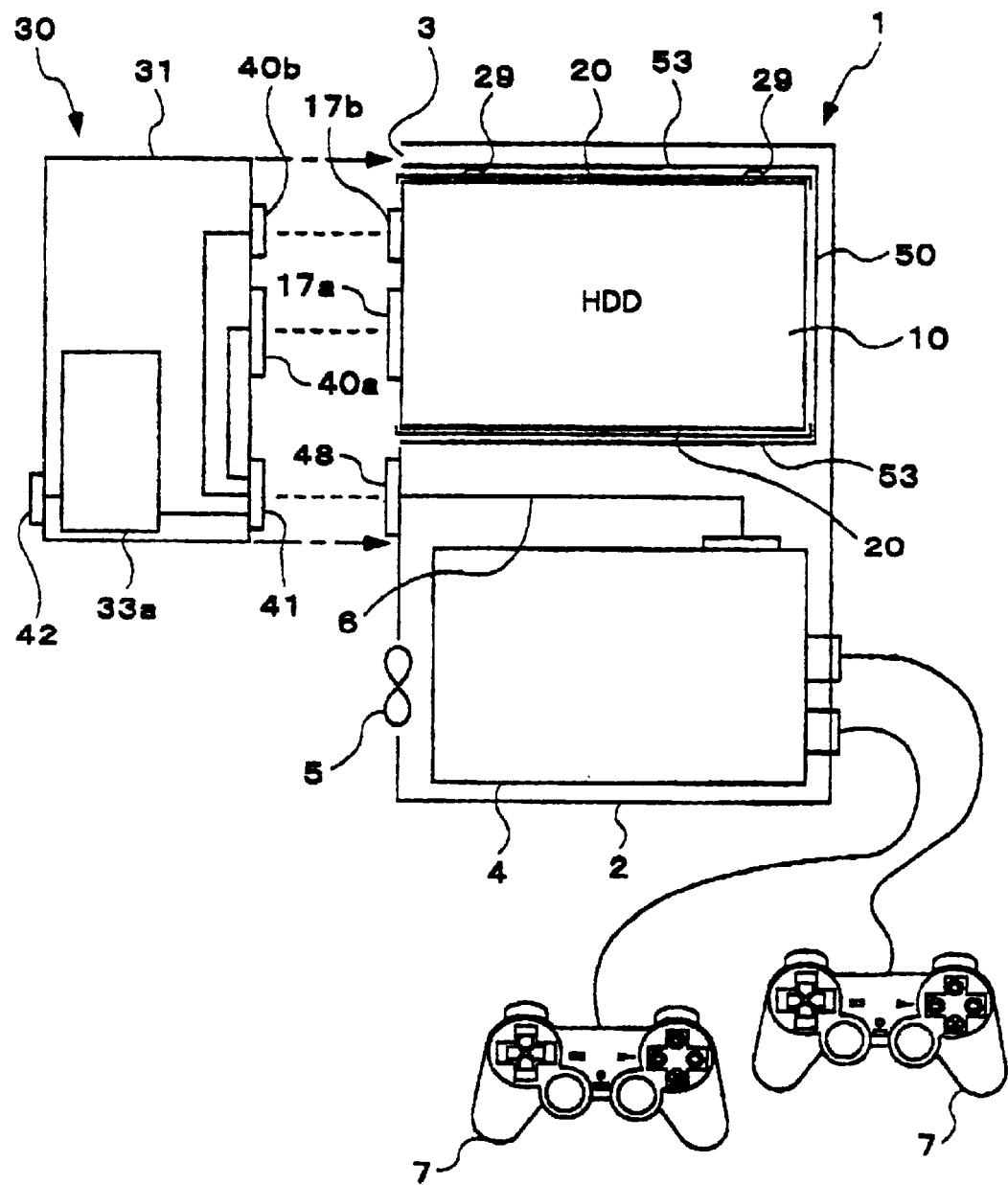
FIG. 1 is a schematic circuit block diagram of a game machine in one embodiment of the present invention.

The information processor in one embodiment is a game machine having a function as an entertainment device. As shown in FIG. 1, the information processor has a game machine main body 1, an external storage device 10 stored from an opening 3 of a main body casing 2 of the game machine to the interior thereof, a cover 30 for blocking the opening 3 of the main body casing 2, and a controller 7 operated by a player. In this embodiment, an external storage device unit is constructed by including the external storage device 10, the cover 30, respective connectors 40a, 40b, 41, 42 described later, and at least one side face frame plate 20.

A storing housing 50 for the external storage device 10, a mother board 4 (mounting various kinds of electronic elements, etc. thereto), a cooling fan 5, an unillustrated DVD drive unit for reproducing game software, movie software, etc., and an unillustrated power circuit, etc. are also arranged within the main body casing 2.

Figure 2:
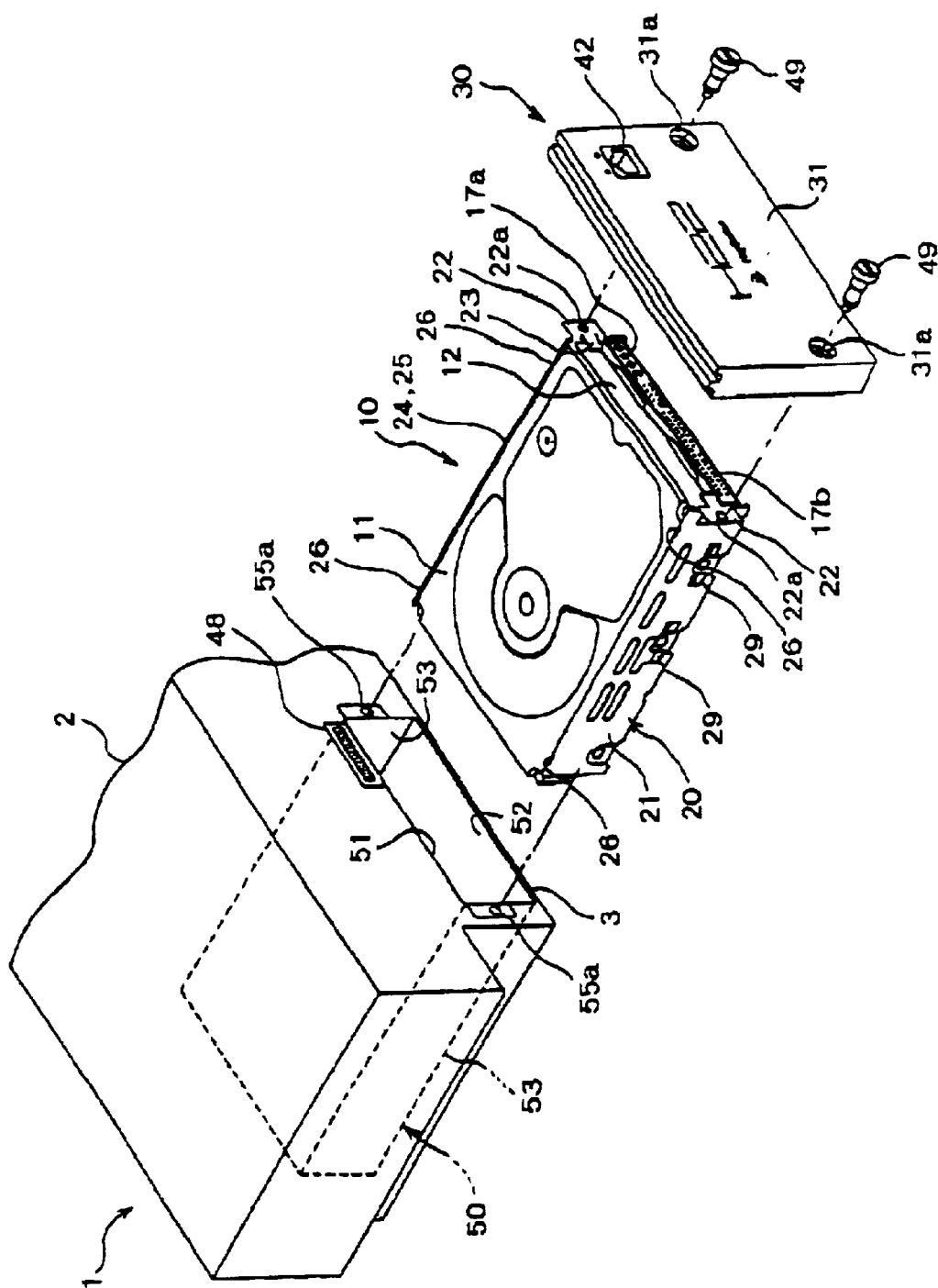
FIG. 2 is a perspective view of a main portion of a game machine main body and an external storage device unit in an embodiment of the present invention.
Figure 3:
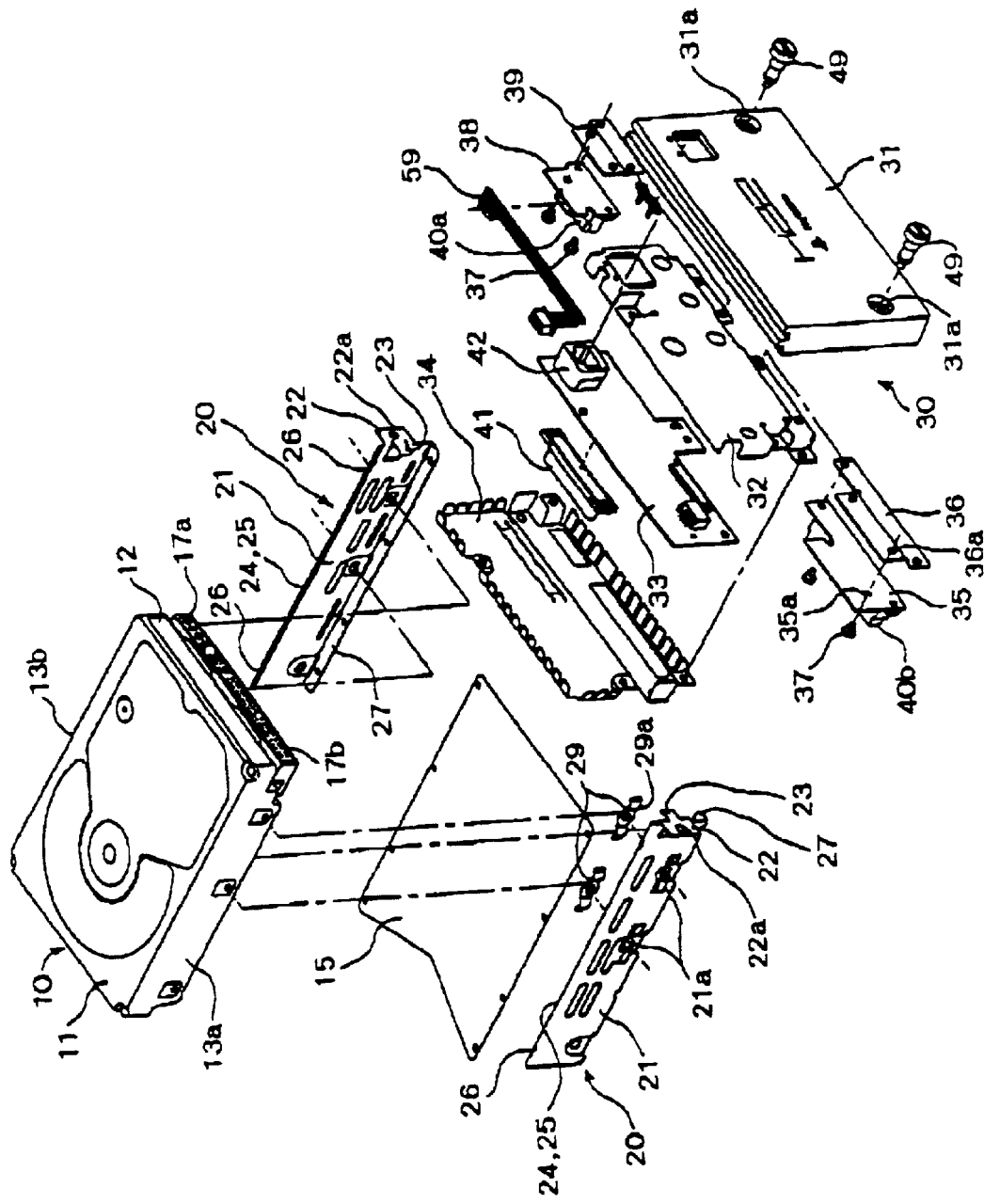
FIG. 3 is a developed perspective view of the external storage device unit in one embodiment of the present invention.

The external storage device 10 is a hard disk drive (HDD) unit. It stores data such as a game status, a game program, etc. that are relative to a game. It also stores data from various kinds of broadcasting media, data obtained through the Internet, etc. As shown in FIGS. 2 and 3, this external storage device 10 has a case 11 mounting a magnetic disk therein. Case 11 is formed in an approximately rectangular parallelepiped shape and includes a power connector 17a and a signal connector 17b as external connection connectors arranged on one face (hereinafter referred to as a front face 12) thereof. A portion forming a bottom face of this case 11 is opened. This opening is covered with a thin insulating sheet 15 (FIG. 3). The insulating sheet 15 is formed in a substantially rectangular shape in conformity with the opening of the rectangular shape, but a backward side of the insulating sheet 15 is notched in a V-shape.

As shown in FIGS. 3 to 6, side face frame plates 20 (respectively covering side faces 13a, 13b) are arranged on the case side faces 13a, 13b of the external storage device 10. The side face frame plates 20 each have a frame plate main body portion 21. Frame plate main body portion 21 is of a rectangular shape. The frame plate main body portions 21 substantially cover both of the case side faces 13a, 13b. Each side face frame plate 20 also includes an attaching flange 22 and a device front face pressing flange 23 formed in front of the frame plate main body portion 21. The side face frame plates 20 further include a device upper face pressing flange 24, formed above the frame plate main body portion 21, and a device bottom face pressing flange 27, formed below the frame plate main body portion 21. Each flange is formed approximately perpendicular to the frame plate main body portion 21. However, the device upper face pressing flange 24 is once bent 180° with respect to the frame plate main body portion 21, and is then again turned up 90° in a reverse direction. As a result, the device upper face pressing flange 24 forms a 90° angle with respect to the frame plate main body portion 21. Corners of the frame plate main body portion 21 and the device upper face pressing flange 24 serve as a rail 25 when the external storage device 10, attaching this side face frame plate 20 thereto, is stored into the storing housing 50. A projecting portion 26, projected upward, is formed in an end portion on a forward side and an end portion on a backward side on the rail 25.

As shown in FIG. 15A, a width Wb of the side face frame plate 20 (except for the projecting portion 26) is set to have a length at which the side face frame plate 20 (except for the projecting portion 26) is reliably stored into the storing housing SO. It is also set to be slightly shorter than a clearance H of an upper wall face 51 and a bottom wall face 52 of the storing housing 50. An entire width Wa of the side face frame plate 20 (including the projecting portion 26) is set to have a length at which an end portion of the side face frame plate 20 (including the projecting portion 26) is caught by an opening edge of the storing housing 50, even when the side face frame plate 20 (including the projection portion 26) is intentionally stored into the storing housing 50. The entire width Wa is also set to be slightly longer than the clearance H of the upper wall face 51 and the bottom wall face 52 of the storing housing 50. Namely, a projecting amount d of the projecting portion 26 is very small and is set to be equal to or smaller than 0.5 mm in this embodiment. In FIGS. 5, 6, 14 and 15A, the projecting amount is drawn relatively large to clarify the existence of the projecting portion 26.

Figure 4:
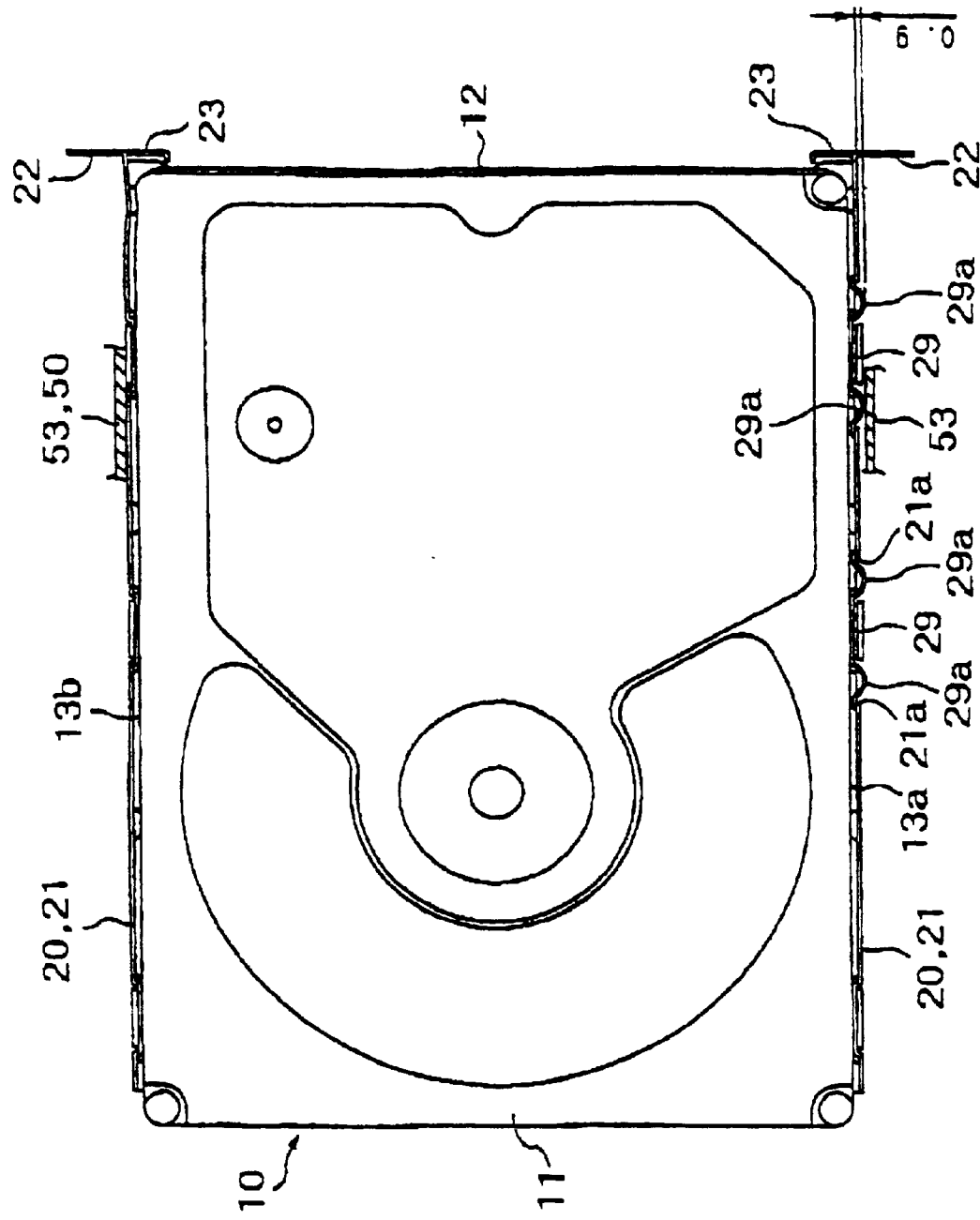
FIG. 4 is a plan view of the external storage device in one embodiment of the present invention.
Figure 5:
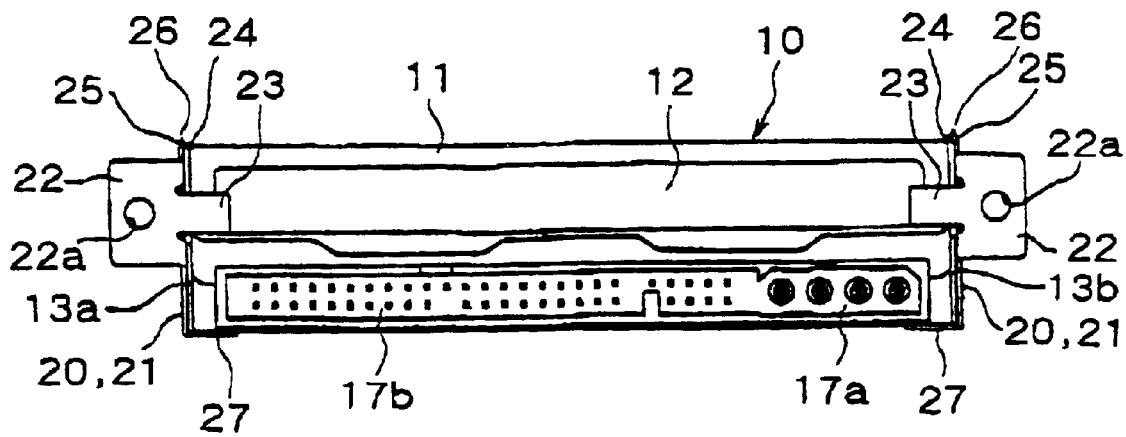
FIG. 5 is a front view of the external storage device in one embodiment of the present invention.
Figure 6:
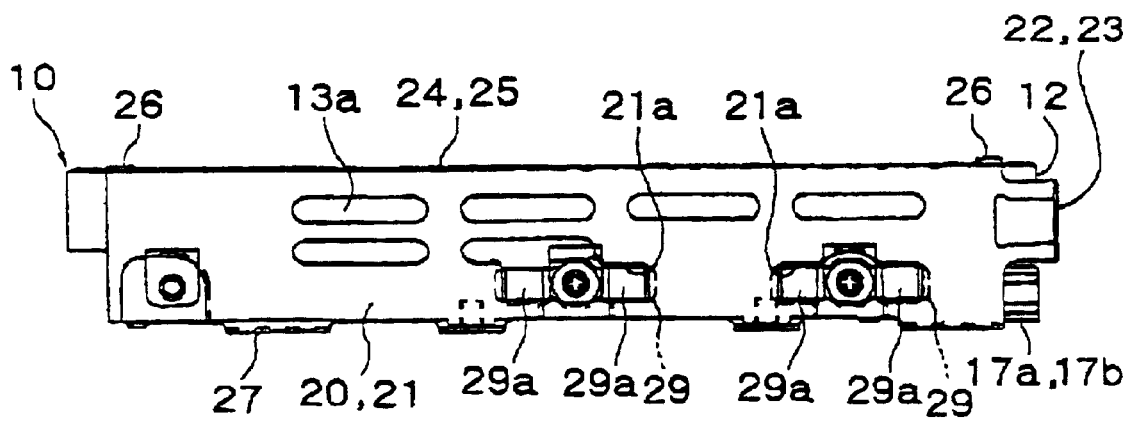
FIG. 6 is a left-hand side view of the external storage device in one embodiment of the present invention.

As shown in FIGS. 3 and 4, a leaf spring 29, functioning as an elastic member, is arranged in one of the side face frame plates 20. In this leaf spring 29, one portion of a metallic plate is formed in an arc shape. Plural spring openings 21a are formed in the frame plate main body portion 21. The leaf spring 29 is attached to the frame plate main body portion 21 such that an arc portion 29a of the leaf spring 29 is projected from this spring opening 21a. In FIG. 4, the device upper face pressing flange 24 is omitted to easily understand the relation of the frame plate main body portion 21 and the leaf spring 29.

As shown in FIG. 2, the storing housing 50 of the external storage device 10 is formed in a rectangular parallelepiped shape in conformity with an external appearance shape of the external storage device 10. A main body connector 48 is arranged in a front end portion of the wall face 51 of this storing housing 50. Main body connector 48 is used for a cover side for transmitting and receiving signals between the external storage device 10, etc.

Figure 7:
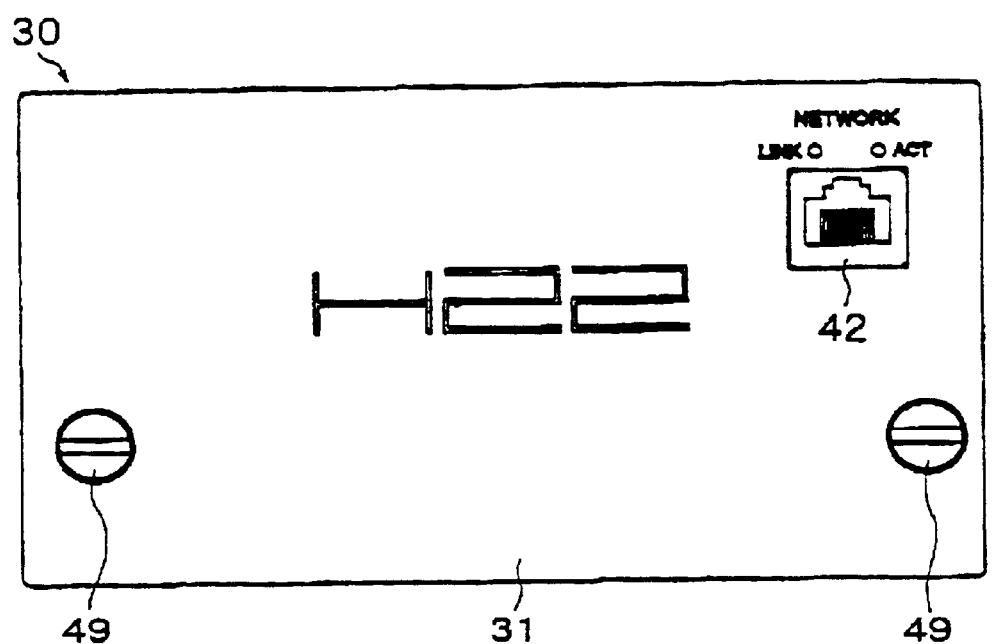
FIG. 7 is a front view of a cover in one embodiment of the present invention.
Figure 8:
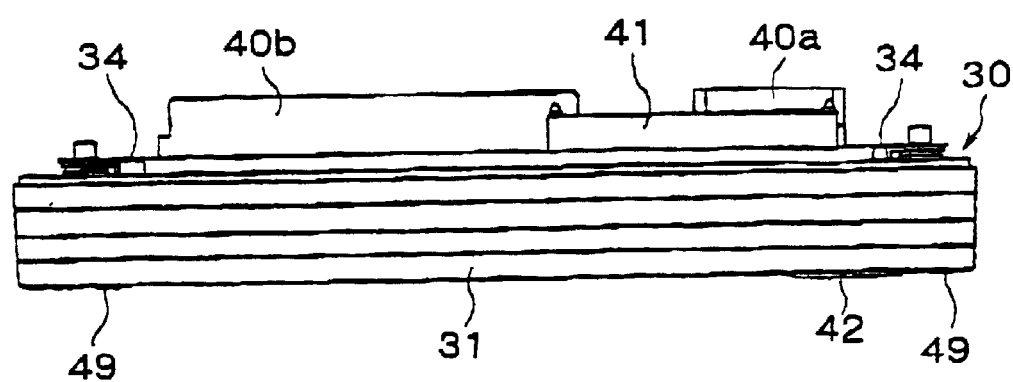
FIG. 8 is a plan view of the cover in one embodiment of the present invention.
Figure 9:
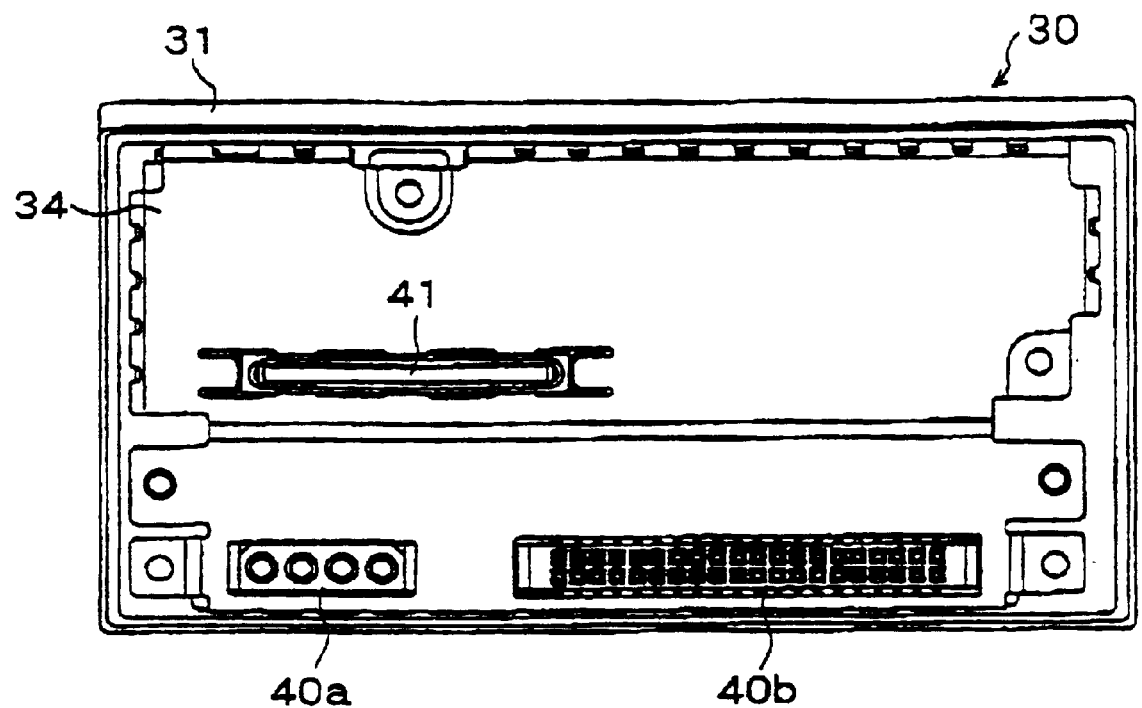
FIG. 9 is a rear view of the cover in one embodiment of the present invention.
Figure 10:
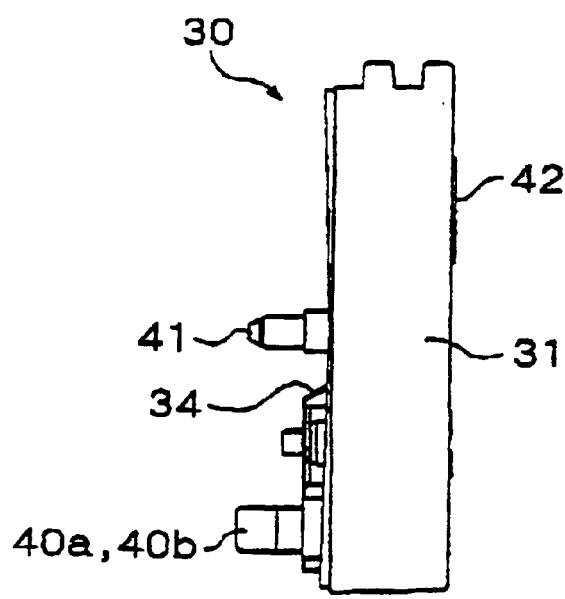
FIG. 10 is a side view of the cover in one embodiment of the present invention.

As shown in FIG. 3, the cover 30 has a cover main body 31 made of resin, a base plate 32 fixed to a rear face of the cover main body 31, a circuit substrate 33 fixed to the base plate 32, and an electromagnetic shield cover 34 covering the circuit substrate 33. A power connector 40a and a signal connector 40b are attached to the base plate 32. Power connector 40a is for a storage device side connected to the power connector 17a of the external storage device 10. Signal connector 40b is for a storage device side connected to the signal connector 17b of the external storage device 10. A connector 41 for a main body side is connected to the cover side main body connector 48 arranged within the main body casing 2 (FIG. 2). A communication connector 42 for external and a communication circuit module 33a(FIG. 1) for processing transmitted and received signal data through this communication connector 42 are arranged in the circuit substrate 33. For example, it is possible to establish external communication by using either Ethernet or a telephone line. As shown in FIGS. 7 and 8, the communication connector 42 is arranged such that a connecting face of the communication connector 42 is exposed from the surface of the cover main body 31. As shown in FIGS. 8 to 10, the power connector 40a (for a storage device side), the signal connector 40b (for a storage device side), and the connector 41 (for a main body side) are arranged such that connecting faces of these connectors are exposed from the electromagnetic shield cover 34 on a rear face side of the cover main body 31. The connector 41 (for a main body side) is electrically connected to the circuit substrate 33 by a cable 59 (FIG. 3). Therefore, the connector 41 (for a main body side) is electrically connected to the communication connector 42 through the communication circuit module 33a that is arranged in the circuit substrate 33. Further, the connector 41 (for a main body side) is electrically connected to the power connector 40a (for a storage device side) and the signal connector 40b (for a storage device side) by the cable 59 and wiring formed on the circuit substrate 33. Namely, as shown in FIG. 1, power and signals between the game machine main body 1 and the external storage device 10 are supplied via the cover 30. The cover 30 blocks the opening 3 for storing the external storage device lo into the game machine main body 1.

As mentioned above, in this embodiment, as shown in FIG. 1, since the power connector 40a and the signal connector 40b are arranged in the cover 30, it is not necessary to secure a space for storing these connectors 40a, 40b within the main body casing 2 of the game machine. Further, the position of wiring 6 for connecting the mother board 4 of the game machine and the external storage device 10 can be freely changed by suitably setting the position of the connector 41. In other words, wiring 6 can be positioned by suitably setting the cover side main body connector 48 connected to the connector 41 at a design stage. Accordingly, in this embodiment, an increase in size of the main body casing, a design change, etc. can be avoided.

Figure 13:
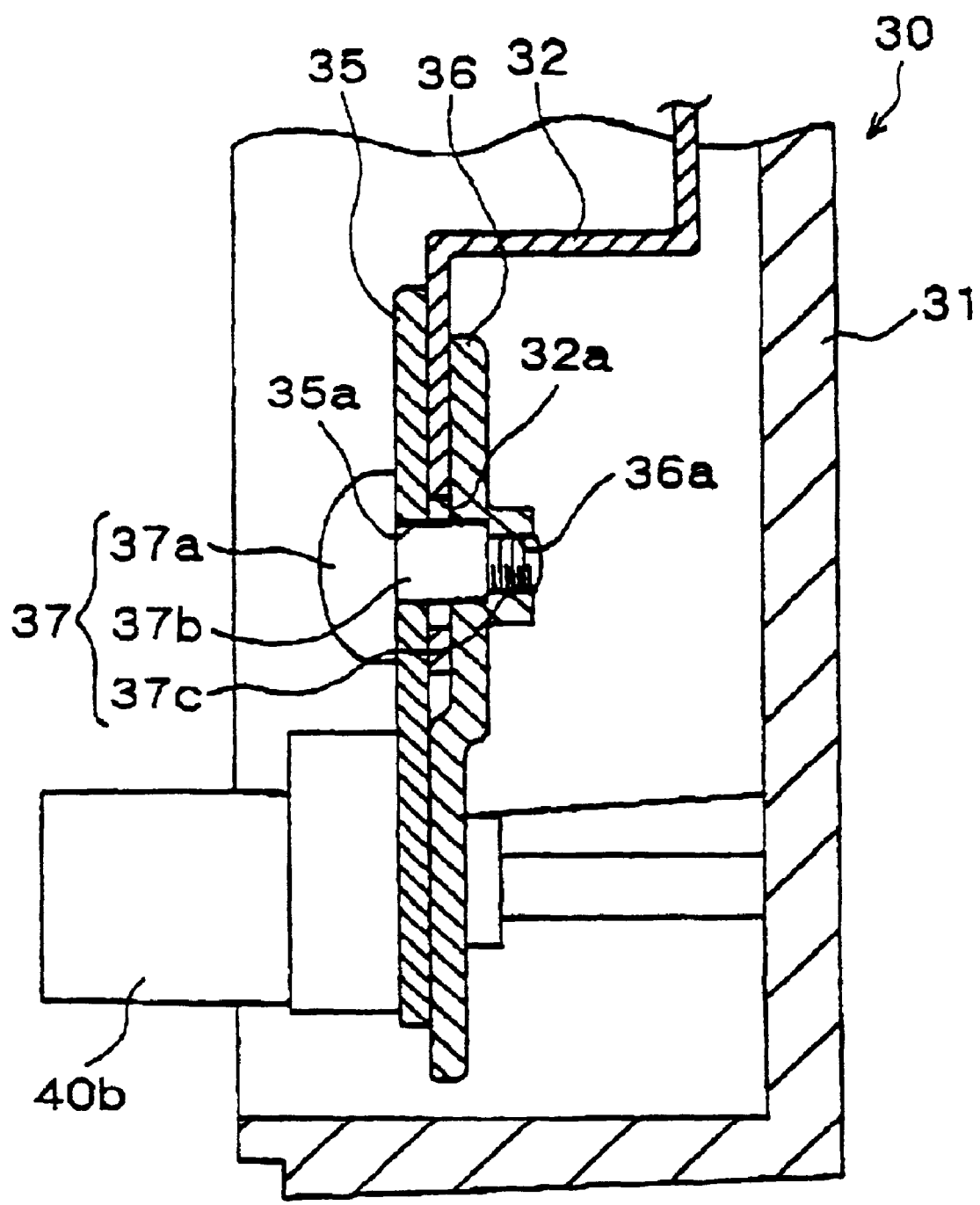
FIG. 13 is a cross-sectional view of a main portion of the cover in one embodiment of the present invention.

As shown in FIGS. 3 and 13, the storage device side signal connector 40b is fixed to a connector fixing plate 35. A screw (connection tool) for attaching the connector fixing plate 35 to the base plate 32 is a shoulder screw 37. Shoulder screw 37 has a screw head portion 37a, a columnar portion 37b forming no male screw thereon, and a screw portion 37c having a screw outside diameter smaller than the outside diameter of the columnar portion 37b. A screw receiving plate 36, forming a female screw hole 36a therein, is arranged to receive the screw portion 37c of the shoulder screw 37. This screw receiving plate 36 is arranged such that the base plate 32 is nipped between this screw receiving plate 36 and the connector fixing plate 35. An insertion hole 35a, having an inside diameter approximately equal to the outside diameter of the columnar portion 37b of the shoulder screw 37, is formed in the connector fixing plate 35. An insertion hole 32a, having an inside diameter larger by about 2 mm than the outside diameter of the columnar portion 37b of the shoulder screw 37, is formed in the base plate 32. The shoulder screw 37 is screwed into the female screw hole 36a of the screw receiving plate 36 through the through hole 35a of the connector fixing plate 35 and the through hole 32a of the base plate 32. In this case, the columnar portion 37b of the shoulder screw 37 is located within the through hole 32a of the base plate 32. As a result, the connector fixing plate 35 and the screw receiving plate 36 can be moved relatively by the difference between the inside diameter of the through hole 32a of the base plate 32 and the outside diameter of the columnar portion 37c of the shoulder screw 37 with respect to the base plate 32. Namely, the storage device side signal connector 40b is arranged relatively movable with respect to the cover main body 31 and the base plate 32. Further, similar to the signal connector 40b for a storage device side (as shown in FIG. 3), the power connector 40a for a storage device side is also arranged relatively movable by the connector fixing plate 38, the screw receiving plate 39 and the shoulder screw 37 with respect to the base plate 32.

A pin interval within the power connector of the external storage device 10, and a pin interval within the signal connector are generally very accurate, and lie within a very small error range. Further, layouts of the power connector and the signal connector with respect to the case 11 of the external storage device 10 are basically approximately the same for different manufacturers. However, there are slight differences between the same manufacturer's products in the relative position relation of the power connector and the signal connector. For example, there is a difference close to 1 mm between different manufacturers products in this relative position relation. Therefore, as described in this embodiment, when the respective connectors 40a, 40b connected to the power connector 17a and the signal connector 17b are attached to the cover 30 and are fixed to the cover 30, connector connection with the cover 30 may be made with respect to the external storage device 10 of a certain manufacturer, but may not be made with respect to the external storage device 10 of another manufacturer because there is a relatively large difference between the manufacturers, products, as mentioned above with respect to the relative position relation of the respective external connection connectors 17a, 17b of the external storage device 10. Therefore, in this embodiment, the power connector 40a, for a storage device side, and the signal connector 40b, for a storage device side, are attached relatively movable to the cover main body 31. In this embodiment, both the power connector 40a and the signal connector 40b are attached relatively movable to the cover main body 31. But only one of the power connector 40a and the signal connector 40b may also be attached relatively movable to the cover main body 31.

Figure 11:
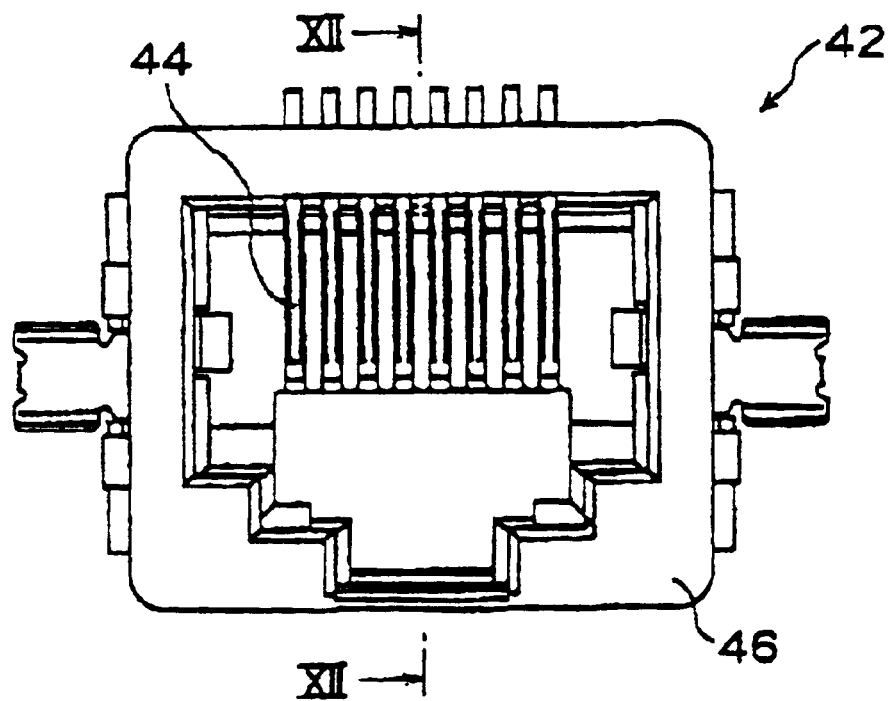
FIG. 11 is a front view of a communication connector in one embodiment of the present invention.
Figure 12:
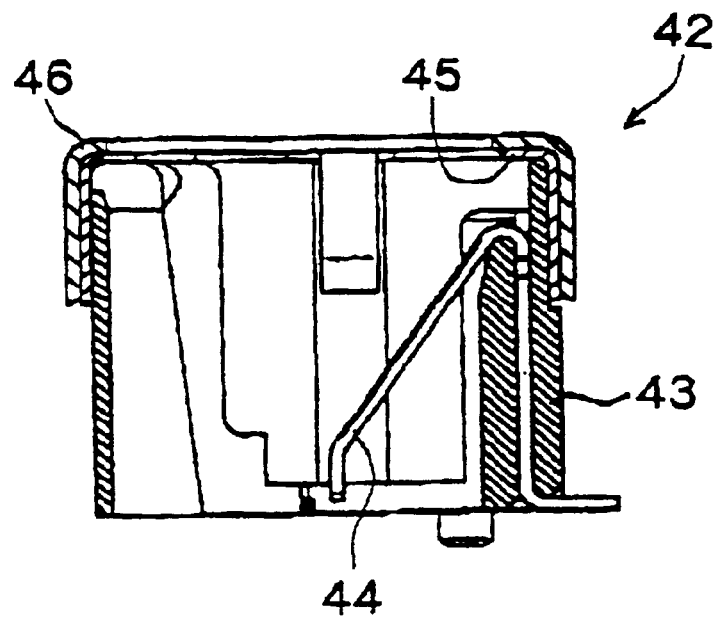
FIG. 12 is a cross-sectional view taken along line XII—XII in FIG. 11.

As mentioned above, as shown in FIGS. 11 and 12, the communication connector 42, having a connection face exposed from the surface of the cover main body 31, has a connector housing 43 made of insulating resin. Communication connector 42 also includes plural connection pins 44 arranged in the connector housing 43. It includes a magnetic shield material 45. Magnetic shield material 45 is made of a metal, and covers one portion of a side face of the connector housing 43 and the connection face. Communication connector 42 also includes a resin cover 46, which covers the surface of this magnetic shield material 45. Since a surface side of the communication connector 42, in this embodiment, is thus covered with the magnetic shield material 45, the communication connector 42 has excellent isolation with respect to an electromagnetic obstacle. Further, since the surface of this magnetic shield material 45 is covered with the resin cover 46, the communication connector 42 also provides excellent protection When the external storage device 10 is used, the external storage device 10 to which the side face frame plates 20 are attached is first pushed into the storing housing 50 within the game machine main body 1, as shown in FIG. 2. In this process, as shown in FIG. 4, the arc portion 29a of the leaf spring 29 (arranged in one side face frame plate 20) comes in contact with one side wall face 53 among the pair of side wall faces 53 of the storing housing 50. Arc portion 29a presses the external storage device 10 against a side of the other side wall face 53. Further, as mentioned above by using FIG. 15A, the entire width Wa of the side face frame plate 20 is slightly longer than the clearance H of the upper wall face 51 and the bottom wall face 52 of the storing housing 50. Therefore, in a storing process of the external storage device 10, the projecting portion 26 of the side face frame plate 20 hits against an upper wall face edge of the storing housing 50, and is crushed by plastic deformation. As shown in FIG. 15B, the entire width of the side face frame plate 20 becomes approximately the same as the clearance H of the upper wall face 51 and the bottom wall face 52 of the storing housing 50, and the external storage device 10 enters the storing housing.

In general, a convex type guide rail is arranged on one of a side face of the external storage device 10 and a side wall face 53 of the storing housing 50, and a concave type guide rail is arranged on the other side face to securely store the external storage device 10 into the storing housing 50. In this method, it is necessary to arrange the guide rails in both side portions of the external storage device 10. A relatively large space is required between the side face of the external storage device 10 and the storing housing side wall face 53. Therefore, the storing housing 50 is large-sized, and it is necessary to precisely process each of the guide rails so as not to cause play so that manufacture cost is increased.

In contrast to this, in this embodiment, the external storage device 10 is pressed against one side wall face 53 of the storing housing 50 and is regulated in position by utilizing elastic force of the leaf spring 29 that is arranged only in one side portion of the external storage device 10 with respect to the position of the external storage device 10 in its side direction. With respect to the position of the external storage device 10 in its vertical direction, the projecting portion 26 of the side face frame plate 20 is plastically deformed and crushed in the storing process. Projecting portion 26 comes in close contact with the upper wall face 51 of the storing housing 50 and is regulated in position. Accordingly, a relatively large occupying space is not required as in the above guide rail, and it is not necessary to arrange the guide rails in both side portions of the external storage device 10 so that the storing housing 50 can be made compact. Further, in this embodiment, manufacturing cost can be restrained since it is not necessary to precisely process the leaf spring 29 and the projecting portion 26 as in the guide rail.

Further, in this embodiment, since the bottom face of the external storage device 10 is covered with the thin insulating sheet 15 (FIG. 3) of high flexibility, there is a possibility that the insulating sheet 15 can be caught by a portion of the bottom wall face 52 of the storing housing 50 in a process in which the external storage device 10 is stored into the storing housing 50. Therefore, in this embodiment, a backward side of the insulating sheet 15 is notched in a V-shape. And, a rear end side (a front end side when a storing direction of the external storage device 10 is set to a reference) of the insulating sheet 15 is set to be inclined (instead of perpendicular) with respect to the storing direction of the external storage device 10. Thus, even when the insulating sheet 15 begins to be caught by a portion of the bottom wall face 52 of the storing housing 50, the insulating sheet 15 can be easily disengaged from this portion.

Figure 14:
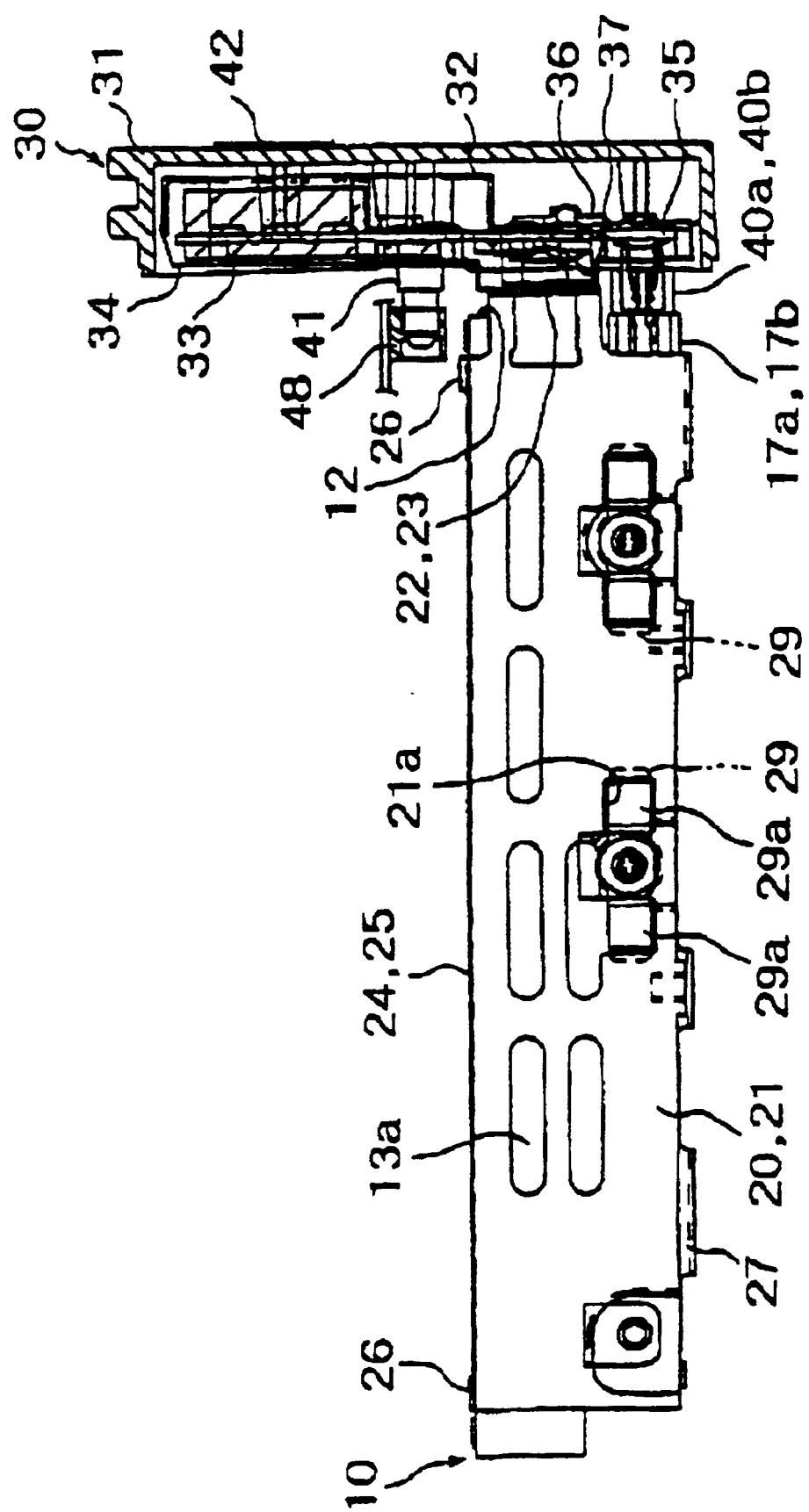
FIG. 14 is a side view in which one portion of the external storage device unit in one embodiment of the present invention is detached.

When the external storage device 10 is stored into the storing housing 50, the opening 3 of the device main body 1 is closed by the cover 30 as shown in FIG. 2. In this case, as shown in FIG. 14, the cover 30 is guided to the main body side such that the main body side connector 41 attached to the cover 30 is connected to the cover side main body connector 48 fixed to an upper portion of the storing housing 50. In a process in which the main body side connector 41 of the cover 30 is connected to the cover side main body connector 48 of the device main body, the power connector 40a for a storage device side and the signal connector 40b for a storage device side, arranged in the cover 30, are relatively moved with respect to the cover main body 31. Power connector 40a and signal connector 40b are connected to the power connector 17a and the signal connector 17b of the external storage device 10, respectively, in conformity with these connector positions. Thus, in the process in which the main body side connector 41 of the cover 30 is connected to the cover side main body connector 48 of the device main body, the power connector 40a for a storage device side and the signal connector 40b for a storage device side arranged in the cover 30 are moved with respect to the cover main body 31 so as to be in conformity with the positions of the power connector 17a and the signal connector 17b of the external storage device 10. This is because it is constructed such that the outside diameter of a tip portion of a pin arranged in one of the connectors connected to each other is gradually reduced toward a tip side. The inside diameter of a tip portion of a hole formed in the other connector is gradually increased toward the tip side. Shapes of the tip portion of the pin and the tip portion of the hole function as guides convenient in mutual position alignment. The pin is reliably stored into the hole even when positions of the pin and the hole are slightly shifted in relation to each other. This is also because the shapes of both connector housings similarly function as the guides convenient in the mutual position alignment.

As shown in FIG. 2, when the main body connector 48 for a cover side in the device main body and the connector 41 for a main body side in the cover 30 are connected, and the power connector 40a for a storage device side and the signal connector 40b for a storage device side in the cover 30 are respectively connected to the power connector 17a and the signal connector 17b of the external storage device 10, a cover fixing screw 49 is inserted into a screw hole 31a that is formed in the cover main body 31. A screw portion on a tip side of this cover fixing screw 49 is screwed into a screw hole 55a of the storing housing 50 through a screw hole 22a, that is on the side face frame plate 20, and the cover 30 and the external storage device 10 are fixed to the device main body 1.

Figure 16:
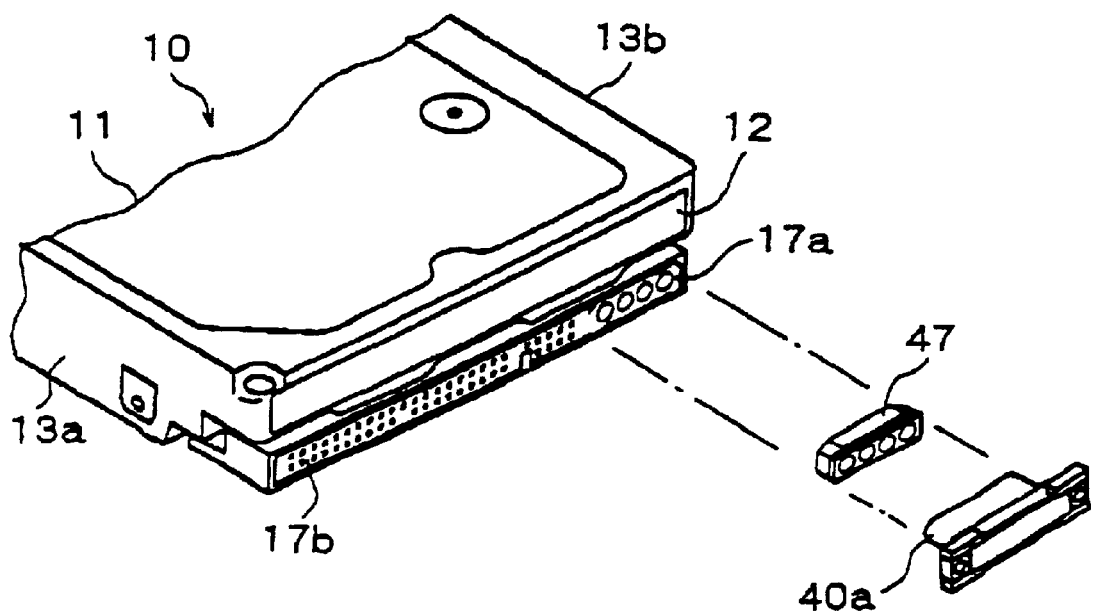
FIG. 16 is a perspective view of an external storage device, a storage device side connector, and a relay connector in another embodiment of the present invention.

In a personal computer, for example, as a general information processor, the external connection connector of the external storage device is typically designed such that, when a connector is once connected to this external connection connector, this connector is basically not disconnected from the external connection connector after this connection. In contrast to this, in this embodiment, a case in which only the external storage device 10 is detached from the device main body 1 and is attached to e.g., another game machine main body 1 might be also employed. Namely, in this embodiment, the number of inserting and pulling times of the external connection connectors 17a, 17b of the external storage device 10 is increased. There is a fear of a reduction in connection performance of the external connection connectors 17a, 17b. Therefore, as shown in FIG. 16, a relay connector 47 is preferably arranged between the external connection connector 17a and the connector 40a for a storage device side in the cover 30. Relay connector 17 is employed so that connection performance is not reduced so much even when the number of inserting and pulling times is increased. It is also preferable that inserting and pulling operations are performed between this relay connector 47 and the connector 40a, for a storage device side in the cover 30, and are basically not performed between the relay connector 47 and the external connection connector 17a.

In the above embodiments, the present invention is applied to a game machine, but is not limited to this case. For example, the present invention may also be applied to a personal computer as one kind of general information processor. The external storage device 10 in the above embodiment is a hard disk drive unit mounting a magnetic disk thereto, but may also be an external storage device 10 mounting another memory medium thereto.

What is claimed is:

1. An external storage device unit adapted for receiving an external storage device having an external connector, the external storage device unit comprising:
   a cover;
   a storage device side connector attached to a first side of the cover and adapted for electrical connection to the external connector; and a main body side connector attached to the first side of the cover and electrically connected to the storage device side connector.

2. The external storage device unit according to claim 1, wherein the main body side connector is electrically connected to the storage device side connector with wiring.

3. The external storage device unit according to claim 1, further comprising:
   a communication connector attached to a second side of the cover; and
   a communication circuit module for processing data transmitted to and received from the communication connector, the communication circuit module being electrically connected to the main body side connector.

4. The external storage device unit according to claim 1, further comprising a relay connector connected to the storage device side connector and adapted for connection to the external connector for providing improved connection reliability.

5. The external storage device unit according to claim 3, wherein the communication connector includes:
   a connector housing having a first surface;
   an electromagnetic shield material having a shield surface, the electromagnetic shield material covering a portion of the first surface of the connector housing; and
   a cover for covering a portion of the shield surface.

6. An external storage device unit adapted for receiving an external storage device having an external connector, the external storage device unit comprising:
   a cover;
   a storage device side connector attached to a first side of the cover and adapted for electrical connection to the external connector, the storage device side connector including a power connector adapted for electrical connection to a power connector of the external connector and a signal connector adapted for electrical connection to a signal connector of the external connector; and
   a main body side connector attached to the first side of the cover and electrically connected to the storage device side connector, the main body side connector being electrically connected to the power connector of the storage device side connector and the signal connector of the storage device side connector.

7. The external storage device unit according to claim 6, wherein the storage device side connector is movable relative to the cover.

8. The external storage device unit according to claim 7, wherein the signal connector of the storage device side connector is movable relative to the cover.

9. An external storage device unit adapted for receiving an external storage device having an external connector, the external storage device unit comprising:
   a cover including a cover main body having a first face, a base plate attached to the first face and having an insertion hole, a connector fixing plate including an insertion hole, and a connection tool for attaching the connection fixing plate to the base plate;
   a storage device side connector attached to the base plate by the connector fixing plate and adapted for electrical connection to the external connector; and
   a main body side connector attached to a first side of the cover and electrically connected to the storage device side connector;

wherein the insertion hole of the base plate and the insertion hole of the connector fixing plate receive the connection tool, the insertion hole of one of the connector fixing plate and the base plate having a first inside diameter and the insertion hole of the other one of the connector fixing plate and the base plate having a second inside diameter, the first inside diameter being larger than the second inside diameter, thereby allowing the connector fixing plate to move relative to the base plate.

10. An information processor, comprising:
    a main body casing having an opening and a cover connector; and
    an external storage device unit including an external storage device arranged in the opening, a cover for blocking the opening, a storage device side connector attached to a first side of the cover and electrically connected to an external connector of the external storage device, and a main body side connector attached to the first side of the cover and electrically connected to the storage device side connector, the cover connector being connected to the main body side connector.

11. The information processor according to claim 10, wherein:
    the external storage device includes a case having a first side; and
    the external storage device unit includes a side face frame plate affixed to the first side of the case.

12. An information processor, comprising:
    a main body casing having an opening and a cover connector;
    an external storage device unit including an external storage device arranged in the opening, the external storage device including a case having a first side, a cover for blocking the opening, a storage device side connector attached to a first side of the cover and electrically connected to an external connector of the external storage device, a side face frame plate affixed to the first side of the case, and a main body side connector attached to the first side of the cover and electrically connected to the storage device side connector, the cover connector being connected to the main body side connector; and
    an elastic member arranged between the side face frame plate and the first side of the case, the elastic member contacting a first wall of the external storage device unit through an opening in the side face frame plate, thereby pressing the external storage device against a second wall of the external storage device unit, wherein
    the external connector attaches to a second side of the case, the second side of the case being adjacent to the first side of the case.

13. The information processor according to claim 12, wherein the case has an approximately rectangular parallelepiped shape.

14. An information processor, comprising:
    a main body casing having an opening and a cover connector;
    an external storage device unit including an external storage device arranged in the opening, the external storage device including a case having a first side, a cover for blocking the opening, a storage device side connector attached to a first side of the cover and electrically connected to an external connector of the external storage device, a side face frame plate affixed to the first side of the case, and a main body side connector attached to the first side of the cover and electrically connected to the storage device side connector, the cover connector being connected to the main body side connector; and a storing housing arranged in the main body casing, the storing housing having a pair of opposed inner wall faces separated by a clearance, wherein the case has a dimension smaller than the clearance, and the side face frame plate has a width smaller than the clearance, whereby the case and the side face frame plate can be received within the storing housing.

15. The information processor according to claim 14, wherein the side face frame plate further includes a projecting portion that increases the width of the side face frame plate to a width greater than the clearance, the projecting portion being deformed upon insertion of the side face frame plate within the storing housing to thereby frictionally secure the side face frame plate within the storing housing.

16. A cover device for covering an opening of a main body casing that contains an external storage device having an external connector, the cover device comprising:

a cover for blocking the opening;

a storage device side connector attached to a first face of the cover and adapted for electrical connection to the external connector; and a main body side connector attached to the first face of the cover and electrically connected to the storage device side connector.

17. A cover device for covering an opening of a main body casing that contains an external storage device having an external connector, the external connector including a power connector and a signal connector, the cover device comprising:

a cover for blocking the opening;

a storage device side connector attached to a first face of the cover, the storage device side connector including a power connector adapted for electrical connection to the power connector of the external connector and a signal connector adapted for electrical connection to the signal connector of the external connector; and a main body side connector attached to the first face of the cover and electrically connected to the power connector of the storage device side connector and the signal connector of the storage device side connector.

18. The cover device according to claim 17, wherein one of the signal connector of the storage device side connector and the power connector of the storage device side connector is movable relative to the cover.

* * * * *

UNITED STATES PATENT AND TRADEMARK OFFICE
CERTIFICATE OF CORRECTION

PATENT NO. : 6,816,379 B2
APPLICATION NO. : 10/061777
DATED : November 9, 2004
INVENTOR(S) : Ken Kutaragi and Takashi Nakamura It is certified that error appears in the above-identified patent and that said Letters Patent is hereby corrected as shown below:

Column 3, line 65, delete "SO" insert --50--.
**Column 4, line 65, "33*a*that" should read --33*a* that--.**
Column 5, line 7, delete "device lo" insert --device 10--.
Column 6, line 2, "manufacturers" should read --manufacturers'--.
Column 6, line 12, "manufacturers" should read --manufacturers'--.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,816,379 B2 | Page 1 of 1 |
| APPLICATION NO. | : 10/061777 | |
| DATED | : November 9, 2004 | |
| INVENTOR(S) | : Ken Kutaragi and Takashi Nakamura | |

It is certified that error appears in the above-identified patent and that said Letters Patent is hereby corrected as shown below:

Column 3, line 65, delete "SO" insert --50--.
Column 4, line 65, "33athat" should read --33a that--.
Column 5, line 7, delete "device lo" insert --device 10--.
Column 6, line 2, "manufacturers" should read --manufacturers'--.
Column 6, line 12, "manufacturers" should read --manufacturers'--.

Signed and Sealed this

Tenth Day of October, 2006

JON W. DUDAS
*Director of the United States Patent and Trademark Office*